(12) United States Patent
Livschitz

(10) Patent No.: US 6,470,329 B1
(45) Date of Patent: Oct. 22, 2002

(54) ONE-WAY HASH FUNCTIONS FOR DISTRIBUTED DATA SYNCHRONIZATION

(75) Inventor: Victoria V. Livschitz, West Bloomfield, MI (US)

(73) Assignee: Sun Microsystems, Inc., Palo Alto, CA (US)

( * ) Notice: Subject to any disclaimer, the term of this patent is extended or adjusted under 35 U.S.C. 154(b) by 287 days.

(21) Appl. No.: 09/613,642

(22) Filed: Jul. 11, 2000

(51) Int. Cl.[7] ............................................... G06F 17/30
(52) U.S. Cl. ............................. 707/1; 707/101; 707/203
(58) Field of Search ................................ 707/1, 2, 6, 7, 707/10, 200, 201, 203, 101; 341/50; 342/127; 340/825.2; 709/248; 380/251, 259; 713/400

(56) References Cited

U.S. PATENT DOCUMENTS

| | | | | |
|---|---|---|---|---|
| 5,867,125 A | * | 2/1999 | Cluff et al. ................. | 342/442 |
| 5,878,095 A | * | 3/1999 | Kainulainen ............. | 340/825.2 |
| 6,088,456 A | * | 7/2000 | McCracken et al. ........ | 380/259 |
| 6,149,522 A | * | 11/2000 | Alcorn et al. ................ | 380/251 |
| 6,247,135 B1 | * | 6/2001 | Feague ........................ | 707/201 |
| 6,308,223 B1 | * | 10/2001 | Opgenoorth ................ | 709/248 |
| 6,374,250 B2 | * | 4/2002 | Ajtai et al. .................. | 707/101 |

* cited by examiner

Primary Examiner—Sanjiv Shah
(74) Attorney, Agent, or Firm—Rosenthal & Osha L.L.P.

(57) ABSTRACT

A method for synchronizing two data sets includes computing a signature for a first data set in a first address space and a signature for a second data set in a second address space using a one-way hash function and comparing the signatures for the first and second data sets to determine whether they are identical. If the signatures are not identical, the method further includes identifying an area of difference between the first data set and the second data set and transferring data corresponding to the area of difference between the first data set and the second data set from the first data set to the second data set.

30 Claims, 9 Drawing Sheets

ONE-WAY HASH FUNCTIONS FOR DISTRIBUTED DATA SYNCHRONIZATION

BACKGROUND OF THE INVENTION

The invention relates generally to methods for synchronizing distributed data sets. Consider a scenario where a large data set, e.g., a database or compiled programming routines, stored in a first memory (or storage device) is duplicated in a second memory (or storage device). This scenario would occur, for example, in a file backup operation wherein a data set is copied onto a magnetic tape or in database replication wherein all or a portion of a database is copied onto a different machine. For discussion purposes, the data set in the first memory or will be referred to as the "original data set," and the data set in the second memory will be referred to as the "remote copy." At some point in time, either the original data set or the remote copy or both may be modified. Typically, the amount of data changed is relatively small in comparison to the total size of the original data set. The task then becomes how to synchronize the original data set and the remote copy in an efficient manner.

There are various prior art techniques for synchronizing distributed data sets. One data synchronization technique uses "time stamps" to identify the areas of differences in the data sets prior to transferring data between the data sets. In this technique, a memory space is allocated to hold the time of the last update for every block of data in the data set. Every executable routine that operates on the content of the data block logs the time stamp of the update. During data synchronization, the time stamp is used to determine if the corresponding data block has changed since the last synchronization. If the corresponding data block has changed, data is then transferred between the original data set and the remote copy. In general, the more precisely the areas of differences in the data sets can be identified, the lesser the amount of data transfer required between the original data set and the remote copy. Time stamps allow immediate identification of different data blocks that need to be synchronized, so no additional processing beyond time stamp comparison is needed to perform the data synchronization. Time stamps are typically used in file backups, code recompilation routines, and database replication.

There are several issues to take into consideration when using time stamps to synchronize data. For example, time stamps allow immediate identification of data blocks that have been updated, but do not indicate whether the content of the data blocks actually changed. Thus, unnecessary data transfer between the original data set and the remote copy may be initiated. Time stamps also do not typically provide sufficient granularity for minimal data transfer. For example, in most file backup services, if a one-byte change occurs in a file, the entire file is transferred. Memory overhead can also be a concern when fine granularity time stamping is required. For example, if it is desirable to keep the granularity of data transfer to a field level for a database table, then the number of fields in the table must be doubled to accommodate time stamping. Furthermore, for proper granular time stamping, upfront design of the data set layout and data access routines is required. This means, for example, that unless adequate space is allocated upfront to hold the time stamps and data access routines are programmed to log the time stamps upon the updates, synchronization at a later time may not be possible.

Another technique for synchronizing data uses "dirty flags" to identify modified blocks of data in a data set. Dirty flags are similar to time stamps, except that they usually hold a Boolean value instead of time. For every block of data, a bit of memory space is allocated to hold the value of the dirty flag. The dirty flag reflects whether the data block has been changed since the last synchronization. Dirty flags are used in database replication and transactional processing. Like time stamps, dirty flags allow immediate identification of different data blocks that need to be synchronized. Synchronization techniques using dirty flags also face many of the challenges discussed above for time stamps. In addition, dirty flags are not applicable to situations where the last time of synchronization is ambiguous. This may occur, for example, if more than one remote copy of the original data set exists and each remote copy is synchronized at different points in time.

Another technique for identifying modified data blocks in a data set is "version numbers." Version numbers are also similar to time stamps. For every block of data, a memory space is allocated to hold the version number of that data block. The version number, usually a string of characters of some fixed length, is changed whenever the data block changes. The version numbers are then used by the synchronization algorithm to determine if the corresponding data block has changed since the last synchronization. Like time stamps, version numbers allow immediate identification of different data blocks that need to be synchronized. Synchronization techniques using version numbers also face many of the challenges discussed above for time stamps, most notable is insufficient granularity for minimal data transfer. Version numbers work well with coarse-grained blocks, especially when the updates are infrequent and/or bandwidth is not an issue. Version numbers are typically used in synchronization operations involving software distribution and source control.

SUMMARY OF THE INVENTION

In one aspect, the invention is a method for synchronizing two data sets. In some embodiments, the method for synchronizing two data sets comprises computing a signature for a first data set in a first address space and a signature for a second data set in a second address space using a one-way hash function. The method further includes comparing the signatures for the first and second data sets to determine whether they are identical. If the signatures are not identical, the method further includes identifying an area of difference between the first data set and the second data set and transferring data corresponding to the area of difference between the first data set and the second data set from the first data set to the second data set.

In some embodiments, the method for synchronizing two data sets comprises subdividing a first data set in a first address space and a second data set in a second address space into their respective elementary data blocks. The method further includes computing a signature for each elementary data block using a one-way hash function and storing the signatures of the elementary data blocks in the first data set in a first array and the signatures of the elementary data blocks in the second data set in a second array. The method further includes comparing each signature in the first array to a corresponding signature in the second array to determine whether they are identical and, if they are not identical, transferring the corresponding data block from the first data set to the second data set.

In some embodiments, the method for synchronizing two data sets comprises subdividing a first data set in a first address space and a second data set in a second address space into their respective elementary data blocks. The method further includes computing a signature for each elementary data block using a first one-way hash function and storing the signatures of the elementary data blocks in the first data set in a first array and the signatures of the elementary data blocks in the second data set in a second array. The method further includes computing a signature for the first array and a signature for the second array using a second one-way hash function and comparing the signatures for the first and second arrays to determine whether they are identical. If the signatures for the first and second arrays are not identical, the method further includes identifying the unique signatures in the first and second arrays and transferring the elementary data blocks corresponding to the unique signatures from the first data set to the second data set.

In another aspect, the invention is a data synchronization system which comprises a first agent having access to a first data set in a first address space, a second agent having access to a second data set in a second address space, and an engine which communicates with the first agent and the second agent when activated. In some embodiments, the engine is configured to send a request to the first agent to compute a signature for the first data set in the first address space and a request to the second agent to compute a signature for the second data in the second address space using a one-way hash function. The engine is also configured to transfer the signature for the first data set from the first address space to the second address space and send a request to the second agent to determine whether the signature for the first data set is identical to the signature for the second data set. The engine is also configured to identify an area of difference between the first data set and the second data set in collaboration with the first and second agents if the signatures of the data sets are not identical and, upon identifying the area of difference between the data sets, transfer data corresponding to the area of difference between the data sets from the first address space to the second address space and copy the data into the second data set.

In some embodiments, the engine is configured to send a request to the first agent to subdivide the first data set into elementary data blocks, compute a signature for each elementary data block using a one-way hash function, and store the signatures of the elementary data blocks in a first array. The engine is also configured to send a request to the second agent to subdivide the second data set into elementary data blocks, compute a signature for each elementary block using the one-way hash function, and store the signatures of the elementary data blocks in a second array. The engine is also configured to transfer the first array from the first address space to the second address space and send a request to the second agent to compare each signature in the first array to a corresponding signature in the second array to determine whether they are identical and, if they are not identical, transfer the corresponding data block from the first data set to the second data set.

In some embodiments, the engine is configured to send a request to the first agent to subdivide the first data set into elementary data blocks, compute a signature for each elementary data block using a first one-way hash function, store the signatures of the elementary data blocks in a first array, and compute a signature for the first array using a second one-way hash function. The engine is also configured to send a request to the second agent to subdivide the second data set into elementary data blocks, compute a signature for each elementary block using the first one-way hash function, store the signatures of the elementary data blocks in a second array, and compute a signature for the second array using the second one-way hash function. The engine is also configured to transfer the signature for the first array from the first address space to the second address space and send a request to the second agent to determine whether the signature for the first array is identical to the signature for the second array. The engine is also configured to identify an area of difference between the first array and the second array in collaboration with the first and second agents if the signatures of the arrays are not identical and, upon identifying the area of difference between the arrays, transfer data corresponding to the area of difference between the arrays from the first address space to the second address space and copy the data into the second data set.

DETAILED DESCRIPTION OF THE INVENTION

Figure 1:
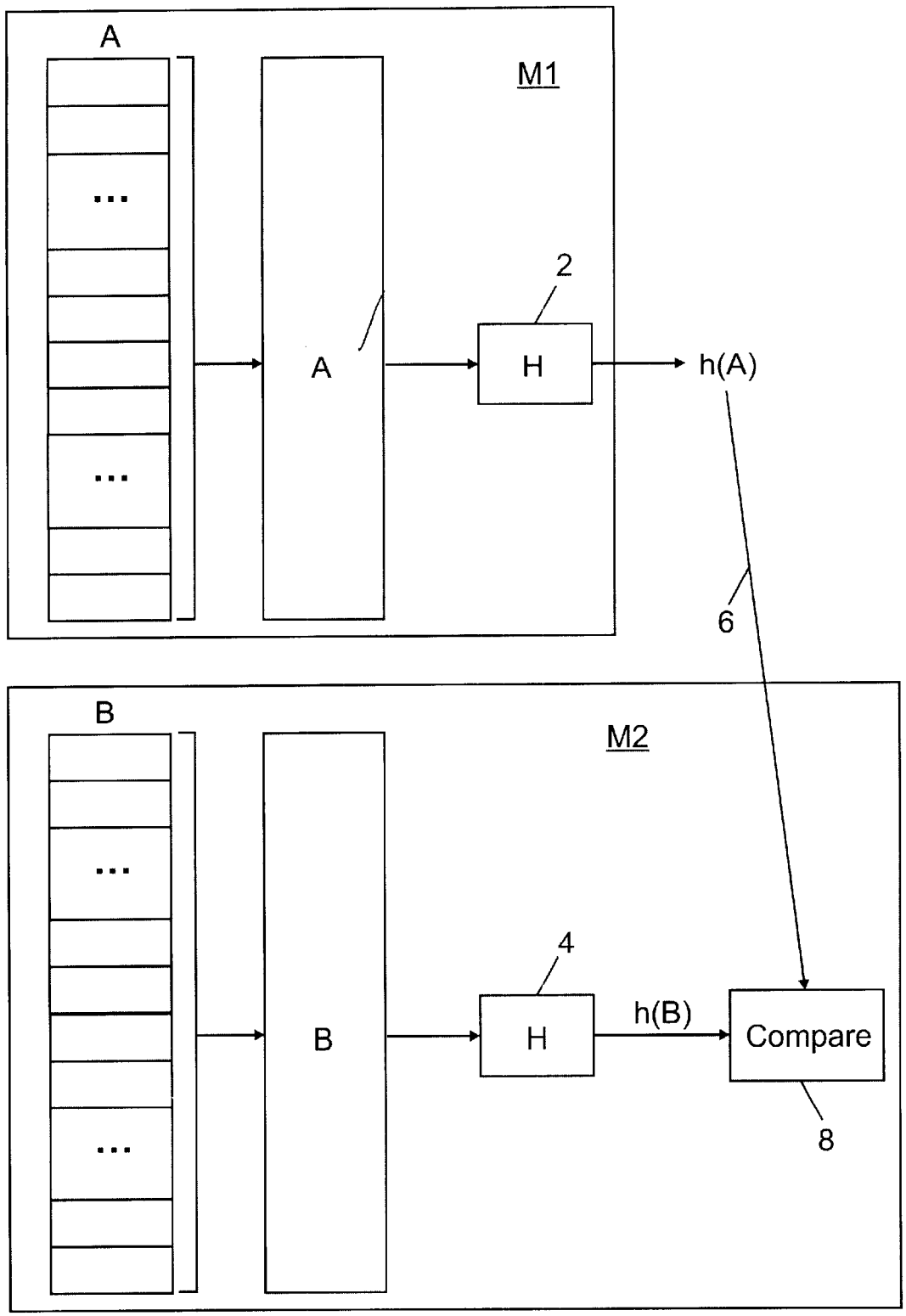
FIG. 1 illustrates a process for determining if synchronization is needed between two data sets in accordance with one embodiment of the invention.

Embodiments of the invention provide a process for synchronizing distributed data sets. In general, the process involves using a one-way hash function to compute the "signature" of a data set of arbitrary nature, e.g., strings, ASCII files, and binary files. More specifically, the process uses a one-way hash function to compute the hash value of an original data set and its remote copy. The process then compares the hash value for the original data set with the hash value for the remote copy to determine whether they are identical. If the hash values are identical, then the original data set and its remote copy are identical, and there is no need for synchronization. If the hash values are not identical, the task then becomes identifying the areas of differences between the two data sets prior to synchronizing the data sets. Embodiments of the invention provide methods for precisely identifying the areas of differences between two data sets.

One-way hash functions are algorithms that turn messages or text into a fixed string of digits, known as the "hash value." The "one-way" means that it is nearly impossible to derive the original message from the hash value. Furthermore, it is nearly impossible for a one-way hash function to produce the same hash value for two different messages. In essence, a one-way hash function provides a unique signature of a message. Various algorithms for computing one-way hash functions for data sets of different nature are known. See, for example, "Secure Hash Standard," Federal Information Processing Standards Publication (FIPS PUB) 180-1, U.S. Department of Commerce, Springfield, Va, Apr. 17, 1995. The implementation of some form of one-way hash algorithms exist off-the-shelf on virtually every computing platform.

One-way hash functions have been used extensively in the field of cryptography to encrypt and decrypt digital signatures. Digital signatures are used to identify and authenticate the sender and message of a digitally distributed message. The digital signature is transformed with a one-way hash function into a message digest. The message digest and the digital signature are then separately transmitted to the receiver. Using the same one-way hash function as the sender, the receiver derives a message-digest from the signature and compares it with the received message-digest to authenticate the message sender. One-way hash functions are also used to index and retrieve items in a database. A search for an item in the database involves computing the hash value of the search term and comparing the hash value of the search term to the hash values of the items in the database.

Before the invention is described in detail, it is helpful to further discuss the nature of one-way hash functions. As previously mentioned, one-way hash functions can be used to produce the signature of an arbitrary data set. Typically, the length of the signature is dramatically smaller than the length of the data set. The amount of computation needed to compute the signature of a data set is linearly proportional to the size of the data set. Data sets of arbitrary length result in signature of fixed length. Two identical data sets result in identical signatures. Two similar, but different documents with very small difference between them, result in different signatures. Two different data sets result in different signatures with great degree of probability. In other words, it is possible, but very rare, for two different data sets to have identical signatures. Therefore, one-way hash functions can be depended on as a basis for synchronizing distributed data sets. However, if no mistake can be afforded in synchronizing data, one-way hash function should not be used.

Various embodiments of the invention will now be discussed with reference to the accompanying figures. FIG. 1 depicts data sets A and B in two different address spaces M1 and M2, respectively. Both data sets A and B are large and can be decomposed into smaller data blocks. The data blocks are either logical or physical in nature. Examples of logical data blocks are object states cached in memory of Java™ virtual machine (JVM), Hypertext Markup Language (HTML) pages cached in memory of a Web browser, or files in the file system of a computer. Examples of physical data blocks are tiles in bitmap pictures, fixed-length records in data files, or 256-byte sentences in a message. However, the physical data blocks need not be a meaningful entity in the context of the application. Let n be the number of elementary data blocks that permit no further decomposition. The size of the elementary data blocks determines the granularity of the smallest detectable change between the data sets A and B. Further, let H represent a hash function that operates on the data sets A and B and any subsets of the data sets A and B available on both address spaces M1 and M2.

A process for synchronizing the data sets A and B in accordance with one embodiment of the invention starts by computing the signatures h(A) and h(B) for the data sets A and B, respectively. The hash function H operates on the data sets A and B to produce the signatures h(A) and h(B), as indicated by reference numerals 2 and 4. The signature h(A) is then transferred from the address space M1 to the address space M2, as indicated by arrow 6. The signatures h(A) and h(B) are compared in the address space M2 to determine whether they are identical. If the signature h(A) is identical to h(B), there is no need for synchronization. If the signature h(A) is not identical to the signature h(B), a recursive process is used to isolate the portions of the data sets A and B that need to be synchronized.

Figure 2:
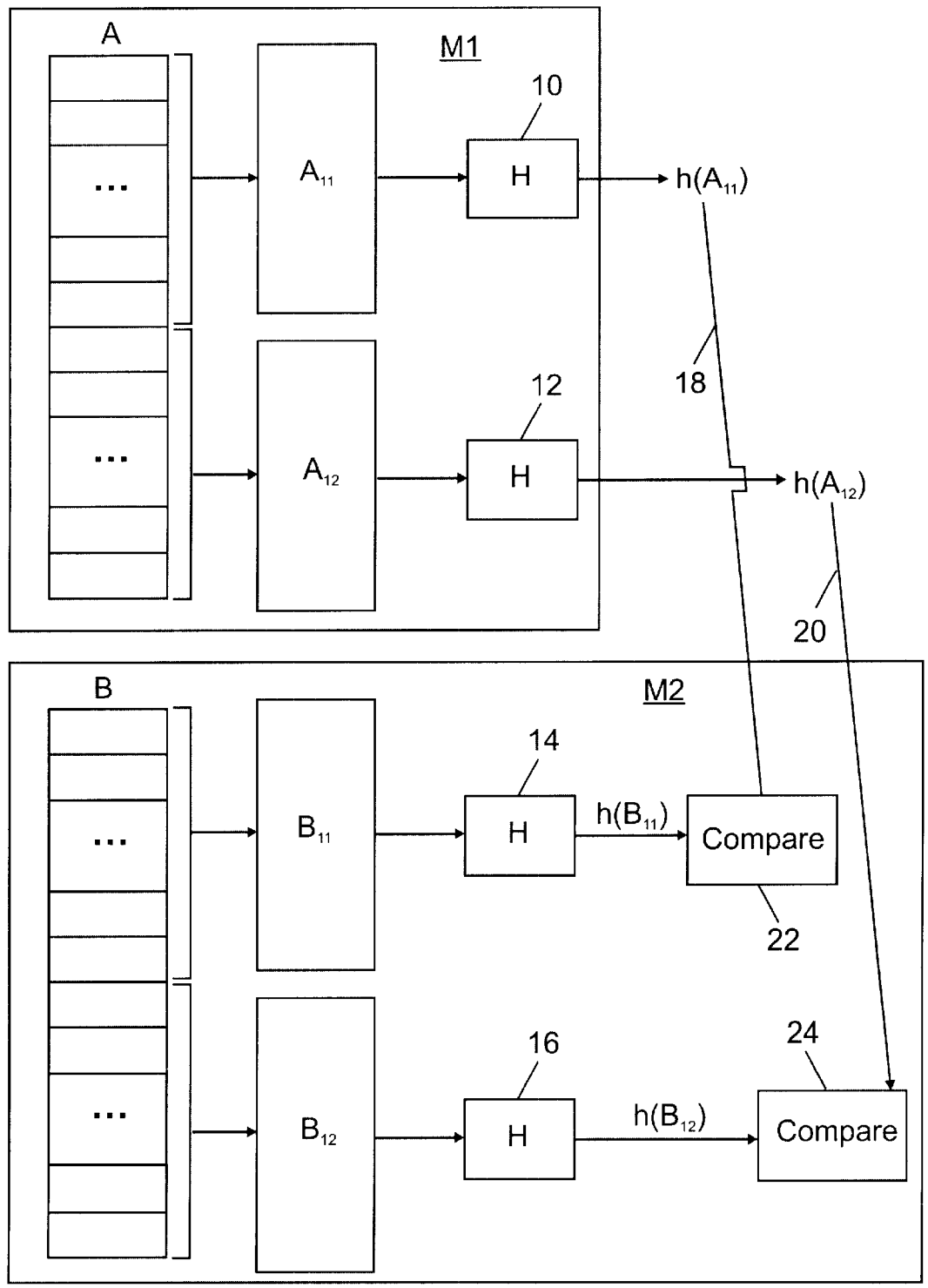
FIGS. 2 and 3 illustrate a recursive process for isolating areas of differences between two data sets in accordance with one embodiment of the invention.

Referring to FIG. 2, the recursive process starts by dividing the data set A into two data blocks $A_{11}$, $A_{12}$ and the data set B into two data blocks $B_{11}$, $B_{12}$. The data sets A, B could each be divided into more than two data blocks, if desired. However, the data sets A and B should be divided into equal number of data blocks. The signatures $h(A_{11})$, $h(A_{12})$ and $h(B_{11})$, $h(B_{12})$ for the new data blocks are computed in their respective address spaces M1 and M2. Again, the hash function H operates on the data blocks $A_{11}$, $A_{12}$ and $B_{11}$, $B_{12}$ to produce the signatures $h(A_{11})$, $h(A_{12})$ and $h(B_{11})$, $h(B_{12})$, as indicated by reference numerals 10–16. 16. The signatures $h(A_{11})$, $h(A_{12})$ are transferred from the address space M1 to the address space M2, as indicated by arrows 18, 20. The signatures $h(A_{11})$ and $h(B_{11})$ are then compared, as shown at 22, to determine whether they are identical. Similarly, the signatures $h(A_{12})$ and $h(B_{12})$ are compared, as shown at 24, to determine whether they are identical. If any of the paired signatures are identical, the corresponding data blocks are determined to be in sync and eliminated from further processing. However, the data blocks corresponding to paired signatures that are not identical are further processed to find the precise location of the differences in the data blocks. If the data blocks with paired signatures that are not identical are elementary data blocks, the recursive process is terminated.

Figure 3:
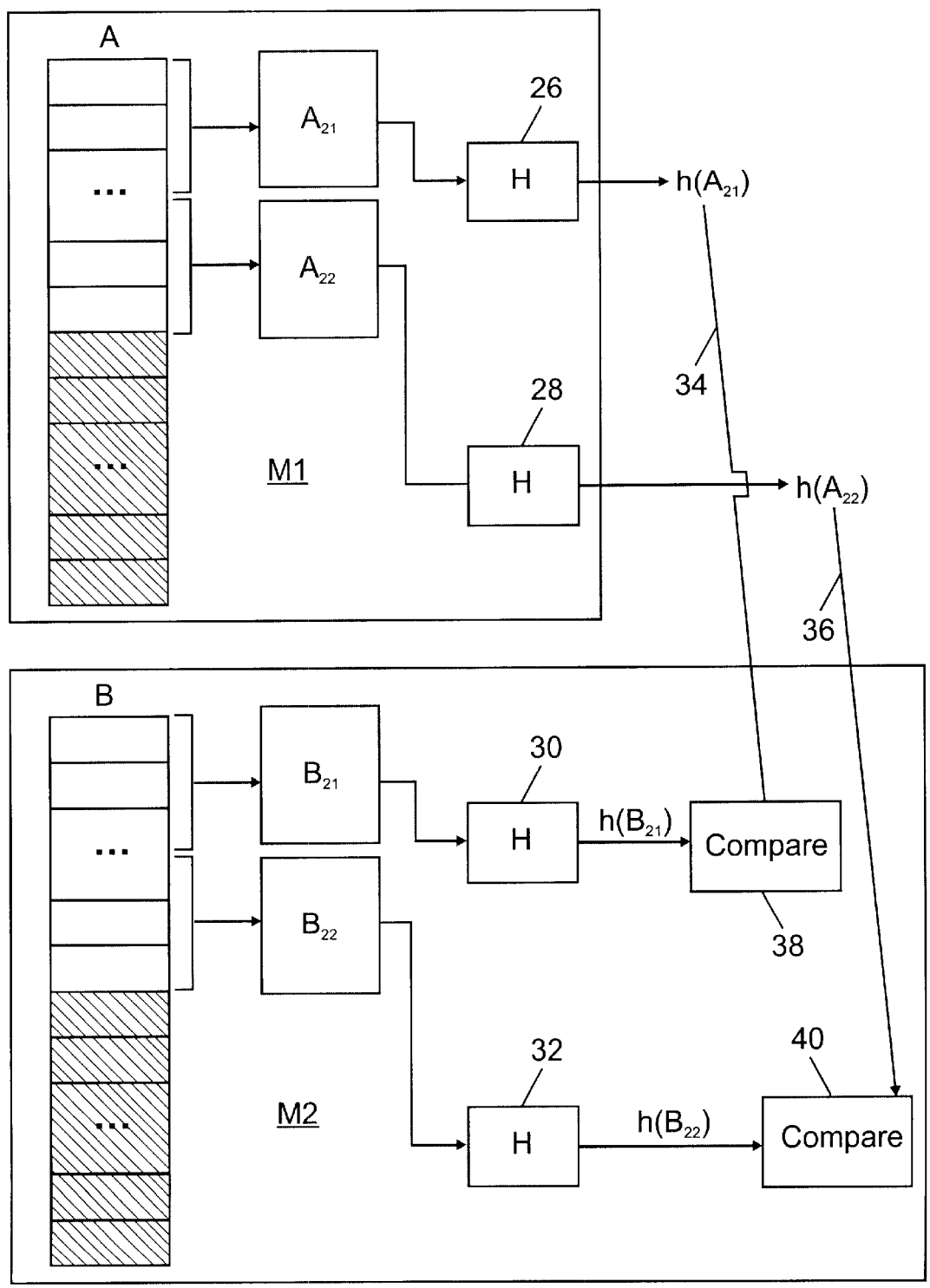

Suppose that $h(A_{12})$ is identical to $h(B_{12})$ and $h(A_{11})$ is not identical to $h(B_{11})$. Then, the data blocks $A_{12}$ and $B_{12}$ corresponding to the paired signatures $h(A_{12})$ and $h(B_{12})$ can be eliminated from further consideration. The recursive process continues by checking the size of the data blocks $A_{11}$ and $B_{11}$ to determine whether the data blocks $A_{11}$ and $B_{11}$, which correspond to the paired signatures that are not identical, are elementary data blocks. Assuming that the data blocks $A_{11}$ and $B_{11}$, are larger than elementary data blocks, each data block $A_{11}$, $B_{11}$ is then subdivided into two blocks. In other words, the data block $A_{11}$ is subdivided into two data blocks $A_{21}$ and $A_{22}$, and the data block $B_{11}$ is subdivided into two data blocks $B_{21}$ and $B_{22}$, as shown in FIG. 3. Each data block $A_{11}$, $B_{11}$ could be subdivided into more than two data blocks, if desired. Then, as illustrated for the data sets A and B in FIG. 2, the signatures for the data blocks $A_{21}$, $A_{22}$ and $B_{21}$, $B_{22}$ are obtained in their respective address spaces M1, M2. The hash function H operates on the data blocks $A_{21}$, $A_{22}$ and $B_{21}$, $B_{22}$ to produce the signatures $h(A_{21})$, $h(A_{22})$ and $h(B_{21})$, $h(B_{22})$, as indicated by reference numerals 26–32.

Figure 4:
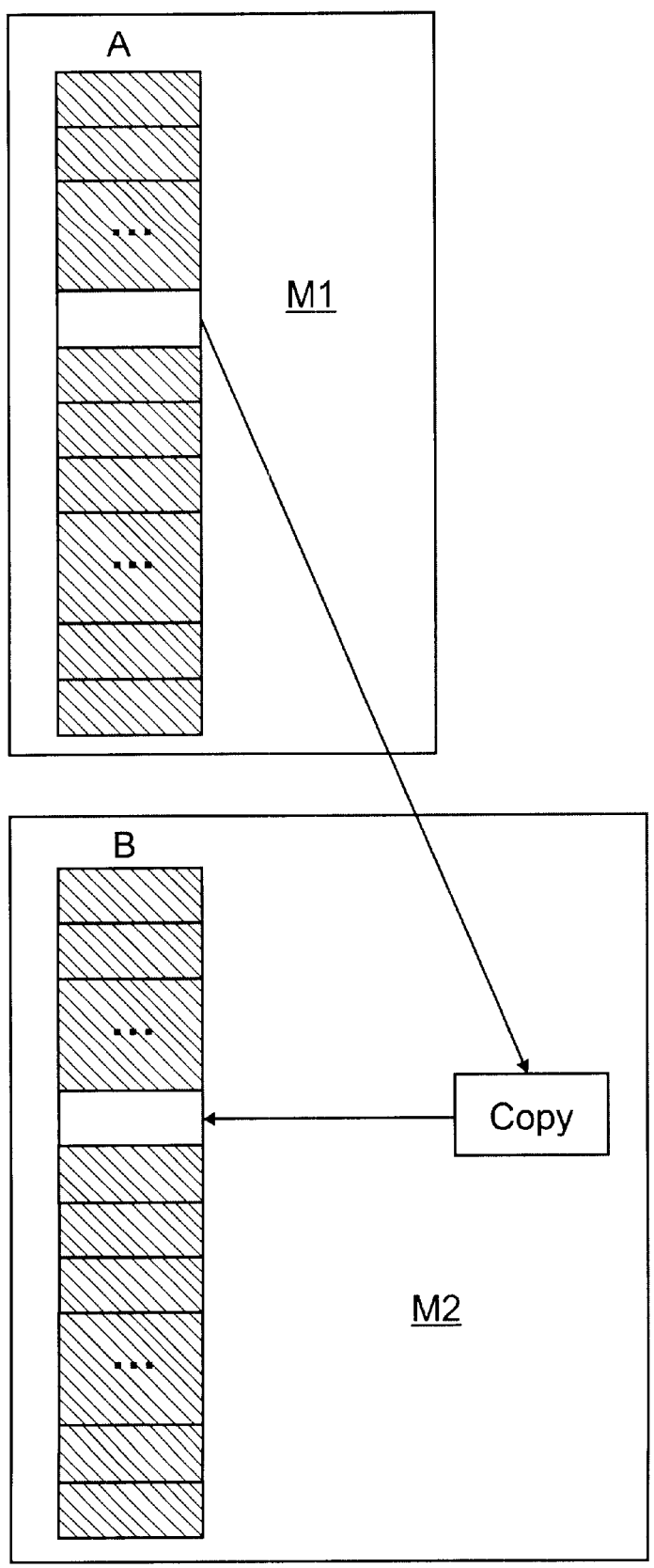
FIG. 4 shows elementary data blocks of one of the two data sets in FIGS. 1–3 being transferred to the appropriate blocks in the other data set.

The signatures of the data blocks $A_{21}$, $A_{22}$ are transferred from the address space M1 to the address space M2, as indicated by arrows 34, 36. The signatures $h(A_{21})$ and $h(B_{21})$ are compared, as shown at 38, to determine whether they are identical. Similarly, the signatures $h(A_{22})$ and $h(B_{22})$ are compared, as shown at 40, to determine whether they are identical. Data blocks corresponding to paired signatures that are identical are removed from further consideration, and the recursive process is again applied to data blocks corresponding to paired signatures that are not identical. It should be noted that several data blocks may need to be processed at every run of the recursive process. For example, if $h(A_{21})$ and $h(B_{21})$ are not identical and $h(A_{22})$ and $h(B_{22})$ are not identical, then the data blocks $A_{21}$, $A_{22}$, $B_{21}$, $B_{22}$ will each need to be divided into two data blocks and processed in the next run of the recursive process. The recursive process is terminated if all the remaining data blocks with paired signatures that are not identical are elementary data blocks. After the recursive process is terminated, all remaining elementary data blocks of the data set A are transferred from address space M1 to address space M2 and copied into the corresponding data blocks in the data set B, as shown in FIG. 4.

A number of observations can be made about the process illustrated in FIGS. 1–4. First, the process is extremely generic in nature and can operate on logical or physical blocks in a variety of applications. Signature calculations are performed on as-needed basis, so no persistent memory is required to store signatures. The recursive process can be multi-threaded so that signatures of data blocks of the data sets A and B can be simultaneously computed. Elementary blocks are identified on the order of log(n) steps. When the areas of differences in the data sets are not numerous, every recursive step is roughly one-half cheaper from computational standpoint than the previous recursive step. The process described above makes effective use of bandwidth for a given granularity of elementary data blocks. The process requires collaboration between two distributed machines, i.e., the machines on which the data sets A and B are stored.

Figure 5:
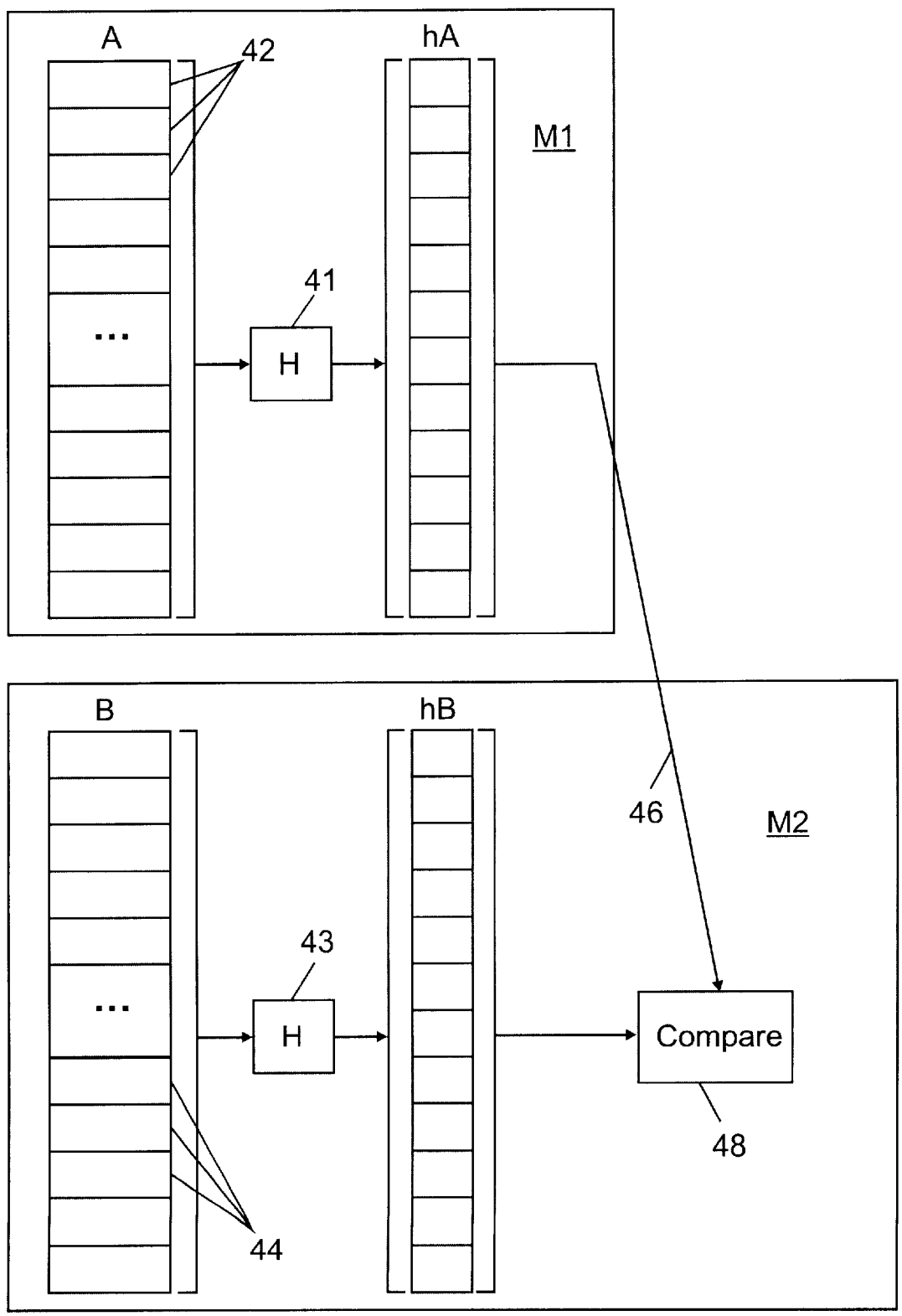
FIG. 5 shows signatures of elementary blocks in two data sets computed and stored in arrays and a process for isolating areas of differences between the two data sets using the arrays in accordance with one embodiment of the invention.

FIG. 5 illustrates another process for synchronizing the data sets A and B. The process involves computing the signature of each elementary data block 42, 44 of data sets A and B in address space M1 and M2, respectively. The signatures for the elementary data blocks of data sets A and B are stored in arrays hA and hB, respectively. The hash function H operates on each elementary block of the data sets A and B to produce the elements of the arrays hA and hB, respectively. The array hB is then transferred to address space M2, as indicated by arrow 46, and compared to array hB on an element-by-element basis, as indicated at 48. Any pair of signatures that are identical are marked for elimination. The elementary blocks of data set A that correspond to unmatched signatures are selected and transferred from the address space M1 to the address space M2. The appropriate data blocks in the data set B are then replaced by the transferred elementary blocks, as shown in FIG. 6.

Figure 6:
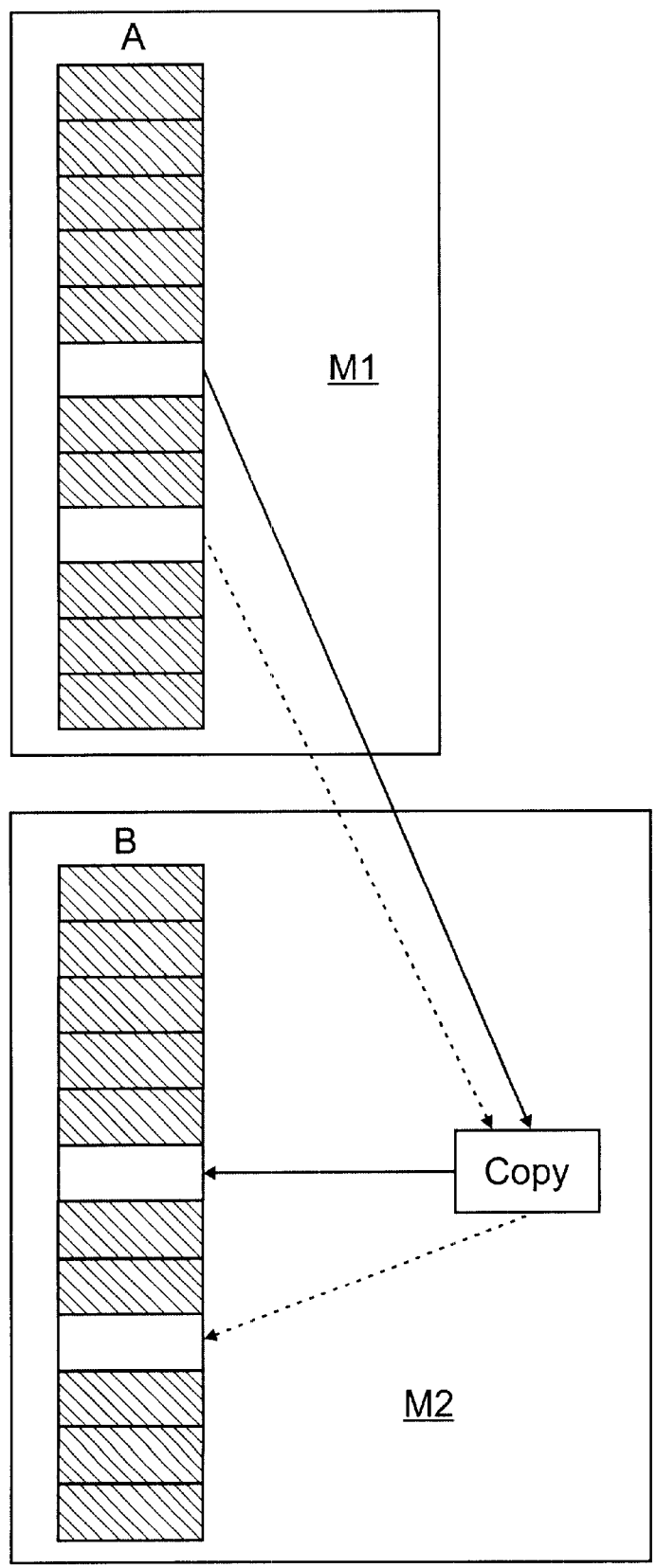
FIG. 6 shows elementary data blocks of one of the two data sets in FIG. 5 being transferred to the appropriate blocks in the other data set.

A number of observations can be made about the process illustrated in FIGS. 5 and 6. First, the process involves calculating signatures upfront in the address spaces M1, M2. Each signature calculation is cheap because it is performed on small elementary data blocks. The cost of isolating the areas of differences between the data sets A and B is constant, i.e., it is not dependent on a recursive process. Signature calculations during the initial stage of the process is well-suited for multithreading. For large n, the transfer of hA from address space M1 to M2 may consume large bandwidth. However, the process is still very generic and can operate on logical or physical blocks in a variety of applications. Also, collaboration between two distributed machines is still required, but significantly smaller in comparison to the process described in FIGS. 1–4.

Figure 7:
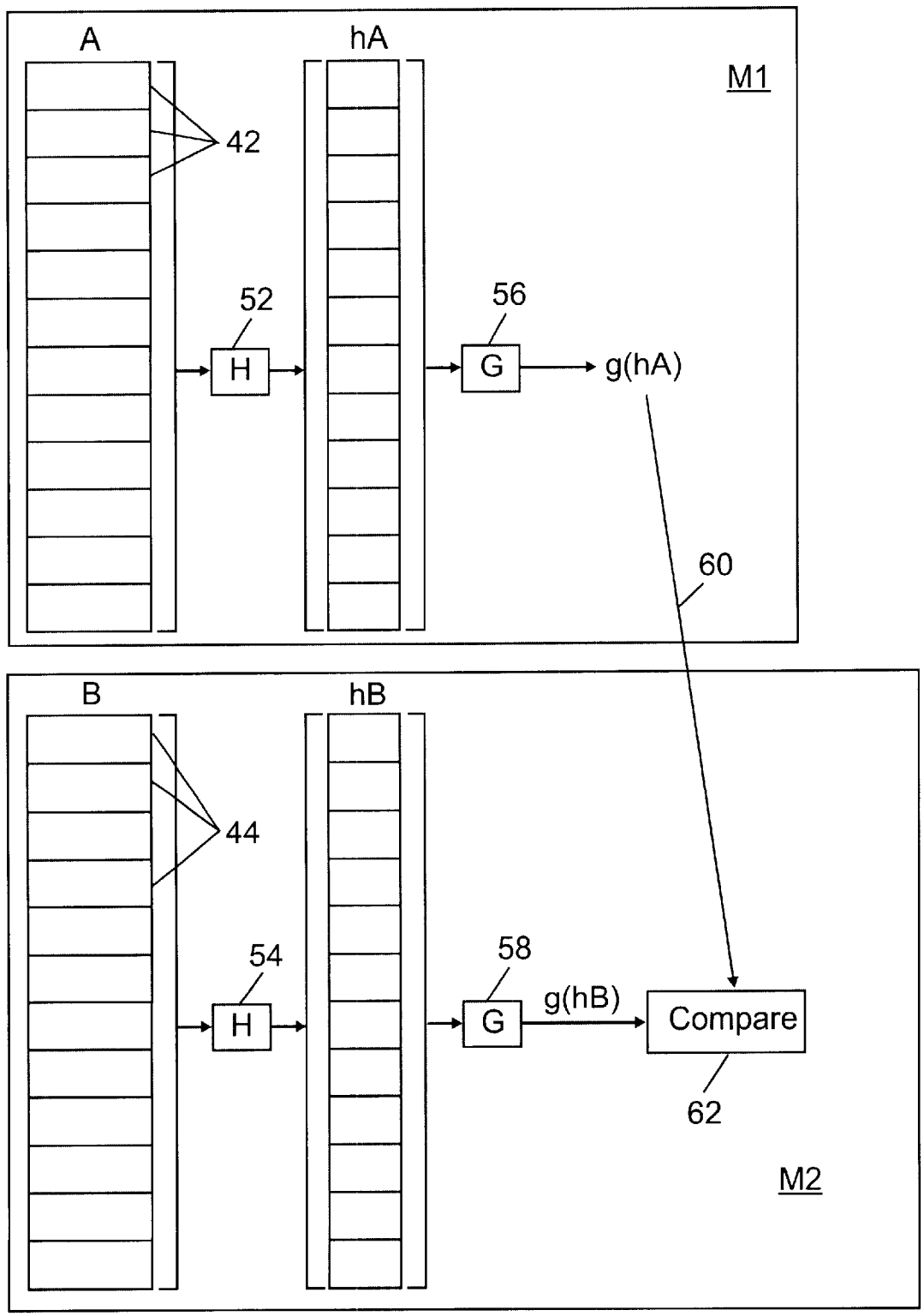
FIG. 7 shows signatures of elementary blocks in two data sets computed and stored in arrays and a process for isolating areas of differences between the two data sets using the arrays in accordance with another embodiment of the invention.

FIG. 7 illustrates another process for synchronizing the data sets A and B. As in the process illustrated in FIGS. 5 and 6, the signature of each elementary data block 42, 44 of the data sets A and B are computed upfront, as indicated at 52 and 54, and stored in arrays hA and hB in address spaces M1 and M2, respectively. Unique signatures are next found using a process similar to the one described in FIGS. 1–4. That is, the signatures h(hA) and h(hB) for the arrays hA and hB are computed, as shown at 56, 58, in address spaces M1 and M2, respectively. The signature h(hA) is then transferred, as indicated by arrow 60, to the address space M2 and compared, as indicated at 62, to the signature h(hB) to determine whether it is identical to the signature h(hB). A hash function G operates on the arrays hA and hB to produce the signatures g(hA) and g(hB). Typically, the hash function G will be different from the hash function H. In general, the hash function H will be selected based on the nature of the data sets A and B, and the hash function G will be selected based on the nature of the hash arrays hA and hB. If the signature g(hA) is not identical to g(hB), the process then proceeds to isolate the elements of the arrays hA and hB that are different. A recursive process similar to the one illustrated in FIGS. 2 and 3 is used to isolate the elements of the arrays hA and hB that are different.

Figure 8:
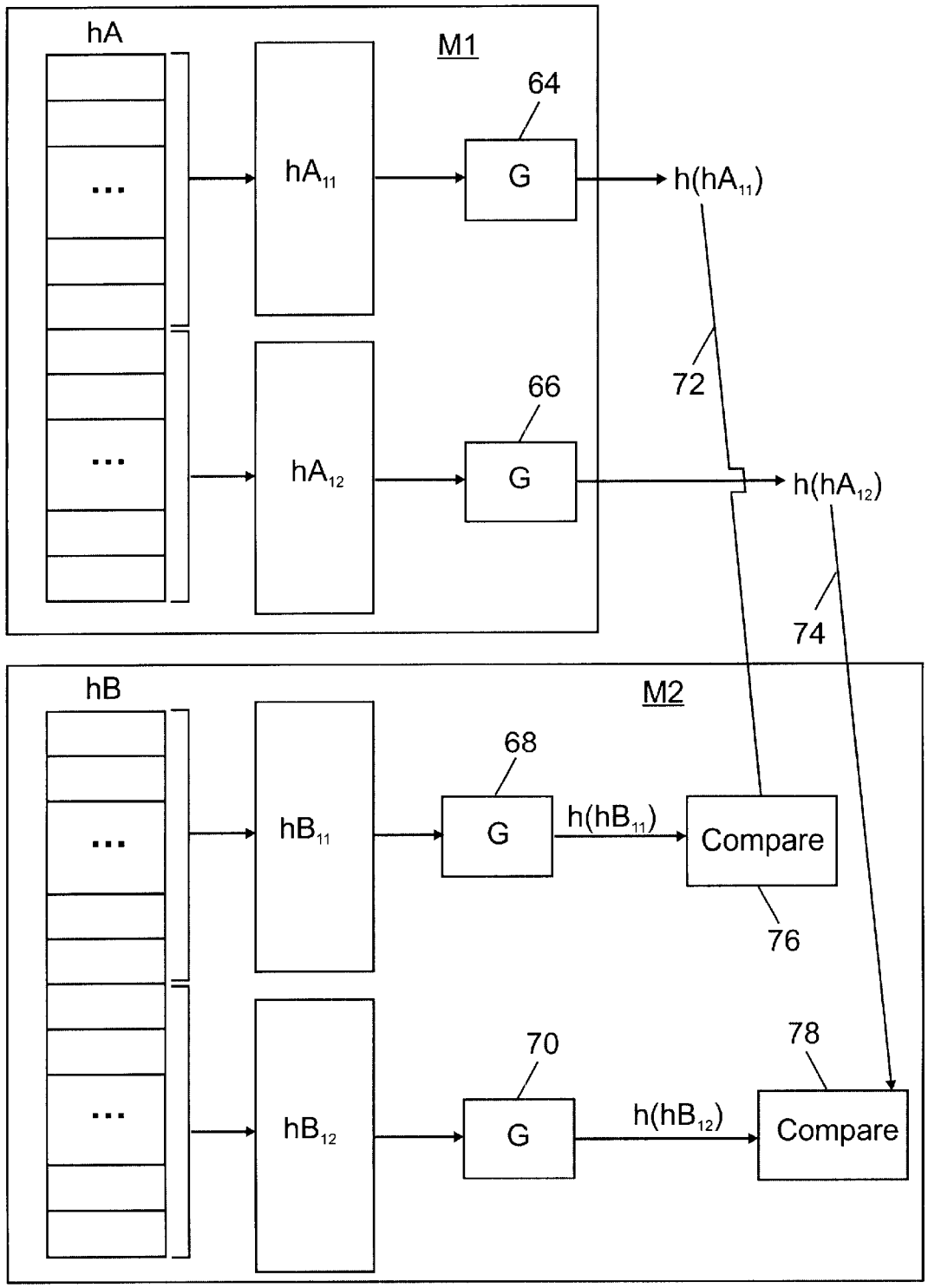
FIG. 8 illustrates a recursive process for isolating areas of differences between two signature arrays in accordance with one embodiment of the invention.

Referring to FIG. 8, the recursive process starts by dividing the array hA into two sub-arrays $hA_{11}$, $hA_{12}$ and the array hB into two sub-arrays $hB_{11}$, $hB_{12}$. Each array hA, hB could be divided into more than two sub-arrays hA and hB, if desired. However, the arrays hA and hB should be divided into equal number of sub-arrays. The signatures $g(hA_{11})$, $g(hA_{12})$ and $g(hB_{11})$, $g(hB_{12})$ for the sub-arrays are computed in their respective address spaces M1 and M2. Again, the hash function G operates on the data blocks $hA_{11}$, $hA_{12}$ and $hB_{11}$, $hB_{12}$ to produce the signatures $g(hA_{11})$, $g(hA_{12})$ and $g(hB_{11})$, $g(hB_{12})$, as indicated by reference numerals 64–70. The signatures $g(hA_{11})$, $g(hA_{12})$ are transferred from the address space M1 to the address space M2, as indicated by arrows 72, 74. The signatures $g(hA_{11})$ and $g(hB_{11})$ are then compared, as shown at 76, to determine whether they are identical. Similarly, the signatures $g(hA_{12})$ and $g(hB_{12})$ are compared, as shown at 78, to determine whether they are identical. If any of the paired signatures are identical, the corresponding sub-arrays are determined to be the same and are eliminated from further processing. However, the sub-arrays corresponding to paired signatures that are not identical are further processed using the recursive process described above. The recursive process is terminated when all the remaining sub-arrays are elementary sub-arrays, i.e., if they have only one element. The elementary data blocks corresponding to the sub-arrays with unique signatures are then transferred from the data set A into appropriate blocks in the data set B.

The process just described is a hybrid of the processes illustrated in FIGS. 1–4 and FIGS. 5–6. Like the processes illustrated in FIGS. 1–4 and FIGS. 5–6, the process just described is extremely generic in nature and can operate on logical or physical blocks in a variety of applications. The process involves calculating signatures upfront in the address spaces M1 and M2, but unlike the process illustrated in FIGS. 5 and 6, the signature array hA is not transferred from the address space M1 to the address space M2. Instead, the signature g(hA) of the hash array hA is transferred from the address space M1 to the address space M2. During the recursive process, signatures of hash sub-arrays are computed and transferred from the address space M1 to the address space M2 and compared. The signatures of the hash arrays, or sub-arrays, may be smaller and faster to compute than the signatures of the data sets, or data blocks. Thus, once the initial signatures are calculated upfront, the actual recursive process may progress much faster than in the process illustrated in FIGS. 1–4. The process is very useful when bandwidth is very limited.

Figure 9:
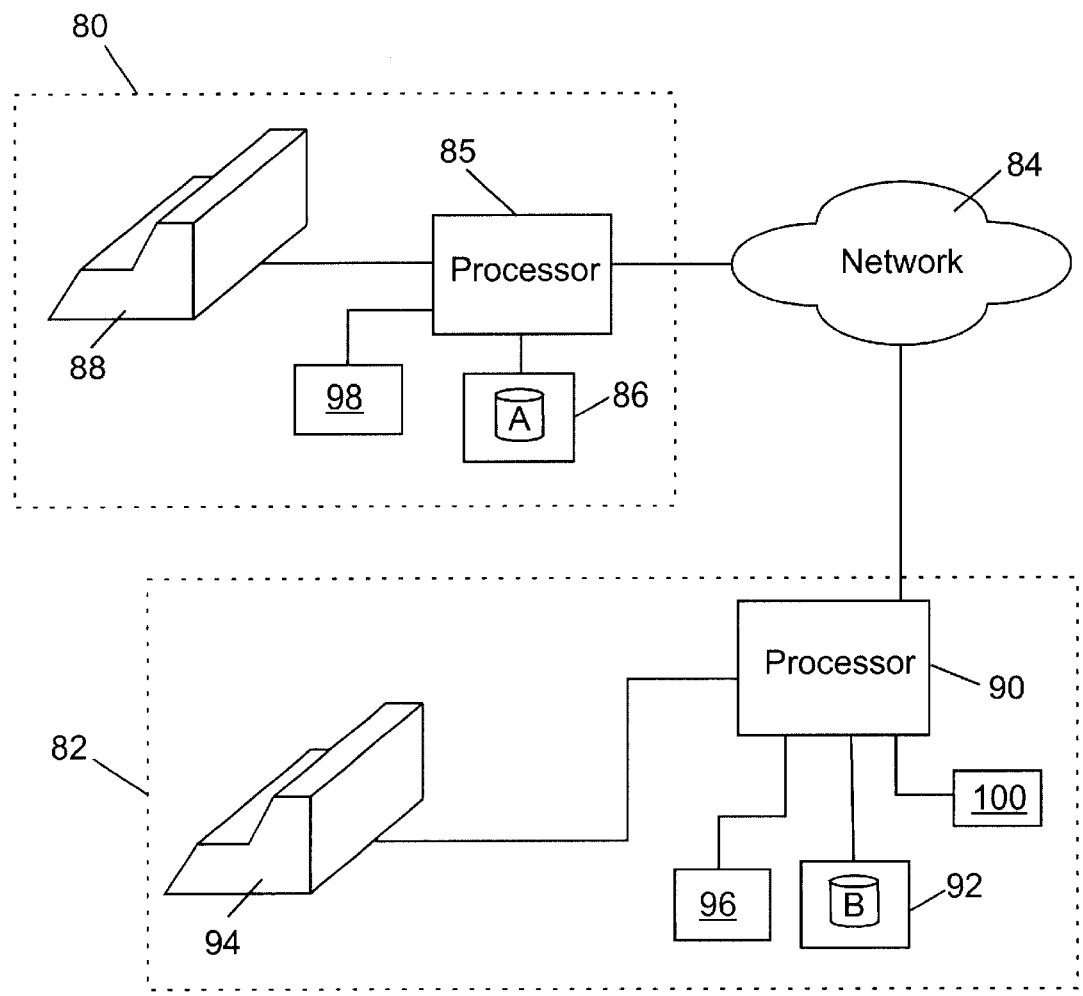
FIG. 9 illustrates a distributed system in which the invention may be implemented.

Each of the data synchronization processes illustrated in FIGS. 1–8 may be implemented as a service that can operate on a broad range of data sets of certain nature. Such service may be implemented in a distributed system. FIG. 9 shows an example of a distributed system which includes computer systems 80 and 82 that are linked by a network 84, e.g., a local area network (LAN) or wide area network (WAN). The distributed system would typically include more than two computer systems. The computer system 80 includes a processor 85, a memory 86, and input/output (I/O) devices such as terminal 88. The computer system 82 includes a processor 90, a memory 92, and I/O devices such as terminal 94. The data set A may be stored on the computer system 80, e.g., in the memory 86, and the data set B may be stored on the computer system 82, e.g., in the memory 92.

The data synchronization service has two distinct distributed components: a single synchronization engine, i.e., engine 96, and a pair of synchronization agents, i.e., agents 98 and 100. The engine 96 may be located anywhere on the network 84, while the agents 98 and 100 are collocated with the data sets A and B that are being synchronized. For example, the engine 96 may be located on the computer system 82 or on a separate computer system (not shown) that can communicate with the computer systems 80 and 82, e.g., via the network 84. The engine 96 and the agents 98 and 100 collaborate to provide distributed synchronization service. For example, the engine 96 may send requests to the agents 98 and 100 to compute signatures of the data sets A and B and any subsets of the data sets A and B in memories 86 and 92, respectively. The engine 96 may send requests to the agents to determine whether two signatures are identical. The engine 96 and agents 98 and 100 each comprise a set of computer-executable instructions.

Preferably, the synchronization service is implemented in technologies such as Java™ that allow on-demand download of the synchronization agents into the machines that contain the synchronized data sets. Such architecture would allow for a very flexible implementation of the data synchronization service. The data synchronization service is defined via object-oriented framework that specifies abstract interfaces for synchronization service, synchronization engine, and synchronization agents. A particular implementation of such framework can then be provided for fine-tuned data synchronization service optimized to operate on specific types of data sets, or in specific computing environments.

The following is an illustration of how the data synchronization processes described above can be used to synchronize data between a personal digital assistant (PDA) device and a remote PDA server, for example. Suppose that a PDA device has been used as a stand-alone device for a period of time to record daily schedules. Further, suppose that the PDA server has been reconnected to the PDA server and there is now a need to synchronize the calendar containing daily schedules for a twelve-month period with a copy of the calendar maintained on the PDA server. Assume that on average, each working day contains four entries and each entry has a startTime, endtime, a place, and description. Further, assume that the PDA device uses a wireless connectivity, e.g., Wireless Application Protocol (WAP), to upload the schedule. In this type of connection, bandwidth is limited. Thus, the amount of information exchanged between the PDA device and the PDA server should be minimized.

Any of the processes described above can be used to synchronize the schedules. First, assume that the process illustrated in FIGS. 5 and 6 is used. The natural granularity of the data block, i.e., the size of the elementary data block, for this example is one day. A month and a week can make the appropriate levels of granularity in a different context, as we will see below. Thus, upon establishing the connection between the PDA device and the PDA server and agreeing to begin the synchronization of the calendars, the data for each day of the calendar is hashed into a short signature of the appropriate length, both on the PDA device and on the PDA server. Assume for the purpose of this example that the sufficient length of the day signature is 8 bytes. Then an array of size 365*8 bytes, which contains the signatures for the daily data on the PDA device, is created and passed from the PDA device to the PDA server. The PDA server compares the array that contains the signatures of the calendar on the PDA device with an array that contains the signatures of the calendar on the PDA server. The PDA server then returns a 365-bit mask that encodes the days with different signatures with 1 and the days with identical signatures with 0 to the PDA device. The PDA device uploads the complete daily schedule for the days whose signatures did not match with the signatures on the PDA server. The PDA server updates these days, and the synchronization process is terminated.

If 365*8 bytes is too long a message to pass from the PDA device to the PDA sever, then the rendering of the first process illustrated in FIGS. 1–5 may be appropriate. In that recursive scenario, the PDA device first sends a signature for a full year to the PDA server. If that signature matches the signature of the year's worth of calendar on the PDA server, the synchronization is done. If not, the signatures of twelve months are computed, uploaded and compared. For the months that don't have a match, the weekly signatures are computed, uploaded and compared. Finally, for the weeks that don't have a match, the daily signatures are computed, uploaded and compared. At the end, the distinct daily schedules are uploaded to the PDA server, and the process is over.

The invention is advantageous in that it allows areas of differences between two data sets of arbitrary nature to be precisely located. In this way, only the data that has changed is transferred between the data sets. This ensures that bandwidth is used efficiently. Moreover, the data synchronization can be done without any upfront planning. The process also requires no additional memory overhead and does not put any requirements on data access or modifier routines.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:
1. A method for synchronizing two data sets, comprising:
    computing a signature for a first data set in a first address space and a signature for a second data set in a second address space using a one-way hash function;
    comparing the signatures for the first and second data sets to determine whether they are identical; and
    if the signatures are not identical, identifying an area of difference between the first data set and the second data set and transferring data corresponding to the area of difference between the first data set and the second data set from the first data set to the second data set.
2. The method of claim 1, wherein comparing the signatures for the first and second data sets to determine whether they are identical includes transferring the signature for the first data set from the first address space to the second address space.

3. The method of claim 1, wherein identifying an area of difference between the first data set and the second data set comprises dividing the first data set into at least two data blocks and the second data set into at least two data blocks and pairing each data block in the first data set with a corresponding data block in the second data set.

4. The method of claim 3, wherein identifying an area of difference between the first data set and the second data set further comprises identifying an area of difference between each pair of data blocks by computing the signature for each data block in the pair of data blocks using a one-way hash function and comparing the signature for the data blocks in the pair of data blocks to determine whether they are identical.

5. The method of claim 4, wherein comparing the signature for the data blocks in the pair of data blocks includes transferring the signatures of each data block divided out of the first data set from the first address space to the second address space.

6. The method of claim 4, wherein identifying an area of difference between each pair of data blocks further comprises eliminating the pair of data blocks from further consideration if the signatures of the data blocks in the pair of data blocks are identical.

7. The method of claim 6, wherein identifying an area of difference between each pair of data blocks further comprises checking the size of the data blocks in the pair of data blocks if the signatures are not identical to determine whether the data blocks are elementary data blocks.

8. The method of claim 7, wherein identifying an area of difference between each pair of data blocks further comprises subdividing each data block in the pair of data blocks into at least two data blocks if the data block is not an elementary data block and pairing each data block in the first of the pair of data blocks with a corresponding data block in the second of the pair of data blocks.

9. The method of claim 8, wherein identifying an area of difference between each pair of data blocks further comprises repeating identifying an area of difference between each pair of data blocks until all the remaining data blocks are elementary data blocks.

10. The method of claim 9, wherein transferring data corresponding to the areas of differences between the first data set and the second data set includes transferring the elementary data blocks from the first data set to the second data set.

11. A method for synchronizing two data sets, comprising:
computing a signature for a first data set in a first address space and a signature for a second data set in a second address space using a one-way hash function;
comparing the signatures for the first and second data sets to determine whether they are identical; and
if the signatures are not identical, dividing the first data set into two data blocks and the second data set into two data blocks, pairing each data block in the first data set with a corresponding data block in the second data set, and identifying an area of difference for each pair of data blocks by
computing the signature for each data block in the pair of data blocks using the one-way hash function and comparing the signature of the data blocks in the pair of data blocks to determine whether they are identical,
eliminating the pair of data blocks from further consideration if the signatures are identical,
checking the size of the data blocks to determine whether the data blocks are elementary data blocks if the signatures are not identical,
subdividing each data block into two data blocks and pairing each data block in the first of the pair of data blocks with a corresponding data block in the second of the pair of data blocks if the data blocks are not elementary data blocks,
repeating identifying an area of difference for each pair of data blocks until all remaining data blocks are elementary data blocks; and
transferring the elementary data blocks from the first data set to the second data set.

12. The method of claim 11, wherein comparing the signatures for the first and second data sets to determine whether they are identical includes transferring the signature for the first data set from the first address space to the second address space.

13. The method of claim 11, wherein comparing the signature of the data blocks includes transferring the signatures of each data block divided out of the first data set from the first address space to the second address space.

14. A method for synchronizing two data sets, comprising:
subdividing a first data set in a first address space and a second data set in a second address space into their respective elementary data blocks;
computing a signature for each elementary data block using a one-way hash function and storing the signatures of the elementary data blocks in the first data set in a first array and the signatures of the elementary data blocks in the second data set in a second array; and
comparing each signature in the first array to a corresponding signature in the second array to determine whether they are identical and, if they are not identical, transferring the corresponding data block from the first data set to the second data set.

15. The method of claim 14, wherein comparing each signature in the first array to a corresponding signature in the second array to determine whether they are identical includes transferring the first array from the first address space to the second address space.

16. A method for synchronizing two data sets, the method comprising:
subdividing a first data set in a first address space and a second data set in a second address space into their respective elementary data blocks;
computing a signature for each elementary data block using a first one-way hash function and storing the signatures of the elementary data blocks in the first data set in a first array and the signatures of the elementary data blocks in the second data set in a second array;
computing a signature for the first array and a signature for the second array using a second one-way hash function and comparing the signatures for the first and second arrays to determine whether they are identical;
if the signatures for the first and second arrays are not identical, identifying the unique signatures in the first and second arrays; and
transferring the elementary data blocks corresponding to the unique signatures from the first data set to the second data set.

17. The method of claim 16, wherein identifying the unique signatures in the first and second arrays comprises dividing the first array into two sub-arrays and the second array into two sub-arrays and pairing each sub-array from the first array with a corresponding sub-array from the second array.

18. The method of claim 16, further comprising identifying the area of difference between each pair of sub-arrays by computing the signature for each sub-array in the pair of sub-arrays using the second one-way hash function and comparing the signature of the sub-arrays in the pair of sub-arrays to determine whether they are identical.

19. The method of claim 18, wherein comparing the signature of the sub-arrays in the pair of sub-arrays includes transferring the signatures of each sub-array derived from the first array from the address space of the first data set to the address space of the second data set.

20. The method of claim 19, wherein identifying the area of difference between each pair of sub-arrays further comprises eliminating the pair of sub-arrays from further consideration if the signatures of the sub-arrays in the pair of sub-arrays are identical.

21. The method of claim 20, wherein identifying the area of difference between each pair of sub-arrays further comprises checking the size of the sub-arrays in the pair of sub-arrays if the signatures are not identical to determine whether the sub-arrays have more than one element.

22. The method of claim 21, wherein identifying the area of difference between each pair of sub-arrays further comprises subdividing each sub-array into two sub-arrays if the sub-array has more than one element and pairing each sub-array in the first of the pair of sub-arrays with a corresponding sub-array in the second of the pair of sub-arrays.

23. The method of claim 22, wherein identifying the unique signatures in the first and second arrays further comprises repeating identifying the area of difference between each pair of sub-arrays until all the remaining sub-arrays have only one element.

24. The method of claim 23, wherein transferring the elementary data blocks corresponding to the unique signatures from the first data set to the second data set includes identifying the elementary data blocks in the first data set which correspond to the remaining sub-arrays and transferring the elementary data blocks from the first data set to the second data set.

25. A data synchronization system, comprising:
a first agent having access to a first data set in a first address space;
a second agent having access to a second data set in a second address space; and
an engine which communicates with the first agent and the second agent when activated, the engine being configured to:
send a request to the first agent to compute a signature for the first data set in the first address space and a request to the second agent to compute a signature for the second data in the second address space using a one-way hash function;
transfer the signature for the first data set from the first address space to the second address space and send a request to the second agent to determine whether the signature for the first data set is identical to the signature for the second data set; and
identify an area of difference between the first data set and the second data set in collaboration with the first and second agents if the signatures of the data sets are not identical and, upon identifying the area of difference between the data sets, transfer data corresponding to the area of difference between the data sets from the first address space to the second address space and copy the data into the second data set.

26. The data synchronization system of claim 25, wherein the first agent, the second agent, and the engine each comprise a set of computer-executable instructions.

27. A data synchronization system, comprising:
a first agent having access to a first data set in a first address space;
a second agent having access to a second data set in a second address space; and
an engine which communicates with the first agent and the second agent when activated, the engine being configured to:
send a request to the first agent to subdivide the first data set into elementary data blocks, to compute a signature for each elementary data block using a one-way hash function, and to store the signatures of the elementary data blocks in a first array;
send a request to the second agent to subdivide the second data set into elementary data blocks, to compute a signature for each elementary block using the one-way hash function, and to store the signatures of the elementary data blocks in a second array;
transfer the first array from the first address space to the second address space and send a request to the second agent to compare each signature in the first array to a corresponding signature in the second array to determine whether they are identical and, if they are not identical, transfer the corresponding data block from the first data set to the second data set.

28. The data synchronization system of claim 27, wherein the first agent, the second agent, and the engine each comprise a set of computer-executable instructions.

29. A data synchronization system, comprising:
a first agent having access to a first data set in a first address space;
a second agent having access to a second data set in a second address space; and
an engine which communicates with the first agent and the second agent when activated, the engine being configured to:
send a request to the first agent to subdivide the first data set into elementary data blocks, to compute a signature for each elementary data block using a first one-way hash function, to store the signatures of the elementary data blocks in a first array, and to compute a signature for the first array using a second one-way hash function;
send a request to the second agent to subdivide the second data set into elementary data blocks, to compute the a signature for each elementary block using the first one-way hash function, to store the signatures of the elementary data blocks in a second array, and to compute a signature for the second array using the second one-way hash function;
transfer the signature for the first array from the first address space to the second address space and send a request to the second agent to determine whether the signature for the first array is identical to the signature for the second array; and
identify an area of difference between the first array and the second array in collaboration with the first and second agents if the signatures of the arrays are not identical and, upon identifying the area of difference between the arrays, transfer data corresponding to the area of difference between the arrays from the first address space to the second address space and copy the data into the second data set.

30. The data synchronization system of claim 29, wherein the first agent, the second agent, and the engine each comprise a set of computer-executable instructions.

* * * * *